US008162192B1

(12) United States Patent
Sanchez

(10) Patent No.: US 8,162,192 B1
(45) Date of Patent: Apr. 24, 2012

(54) ATTACHMENT DEVICE FOR WASTE RECEPTACLES

(76) Inventor: Moises A. Sanchez, Logan, UT (US)

( * ) Notice: Subject to any disclaimer, the term of this patent is extended or adjusted under 35 U.S.C. 154(b) by 464 days.

(21) Appl. No.: 12/421,534

(22) Filed: Apr. 9, 2009

(51) Int. Cl.
*B60R 9/06* (2006.01)
(52) U.S. Cl. ........................................................ 224/521
(58) Field of Classification Search .................. 224/521; 403/109.1; 414/462; 248/354.1
See application file for complete search history.

(56) References Cited

U.S. PATENT DOCUMENTS

| | | | | |
|---|---|---|---|---|
| 2,051,265 A * | 8/1936 | Martin | ........................... | 224/487 |
| 4,400,129 A * | 8/1983 | Eisenberg et al. | ............ | 414/462 |
| 4,593,840 A * | 6/1986 | Chown | ........................... | 224/520 |
| 4,856,686 A * | 8/1989 | Workentine | ................... | 224/497 |
| 5,067,641 A * | 11/1991 | Johnson et al. | ................ | 224/501 |
| 5,183,293 A | 2/1993 | Julian | | |
| 5,385,280 A * | 1/1995 | Littlepage et al. | ............. | 224/521 |
| 5,730,345 A * | 3/1998 | Yeckley et al. | ................ | 224/505 |
| 5,845,831 A * | 12/1998 | Nusbaum et al. | .............. | 224/505 |
| 6,164,896 A | 12/2000 | Cummins | | |
| 6,309,167 B1 | 10/2001 | Mc Pherrin | | |
| 6,361,264 B1 | 3/2002 | Guthrie et al. | | |
| 6,409,065 B1 * | 6/2002 | Edgerly | ......................... | 224/508 |
| 6,655,895 B1 * | 12/2003 | Dahl | .............................. | 414/462 |
| 6,698,995 B1 * | 3/2004 | Bik et al. | ....................... | 414/462 |
| 7,101,142 B2 | 9/2006 | Bik et al. | | |
| 7,503,135 B2 * | 3/2009 | Chafin | ........................... | 40/591 |
| 7,798,760 B2 * | 9/2010 | Strassman et al. | ............ | 414/462 |
| 2003/0152449 A1 * | 8/2003 | Marich et al. | .................. | 414/462 |
| 2004/0164517 A1 | 8/2004 | Lewy et al. | | |
| 2004/0232184 A1 | 11/2004 | Moen et al. | | |
| 2006/0291985 A1 | 12/2006 | Sullivan | | |
| 2009/0028679 A1 * | 1/2009 | Smith | ........................... | 414/462 |

* cited by examiner

*Primary Examiner* — Brian D Nash

(57) ABSTRACT

An attachment device for attaching a waste receptacle to a vehicle hitch. The device comprises of an elongated base that attaches to the hitch of the vehicle such that the base is perpendicular to the ground; an elongated sliding bar that is slidably disposed in the base near the bottom end such that it is parallel to the ground; and an elongated vertical component that is slidably disposed inside the base at the top end. The vertical component can slide up and down within the base. There is a T-shaped wing extending from the top end of the vertical component, and this wing is oriented generally parallel to the ground In addition, there is a gripping component pivotally attached to the wing, which grips the waste receptacle and an arc-shaped stabilizing arm that is pivotally attached to the sliding bar. This latter component helps stabilize the waste receptacle.

4 Claims, 5 Drawing Sheets

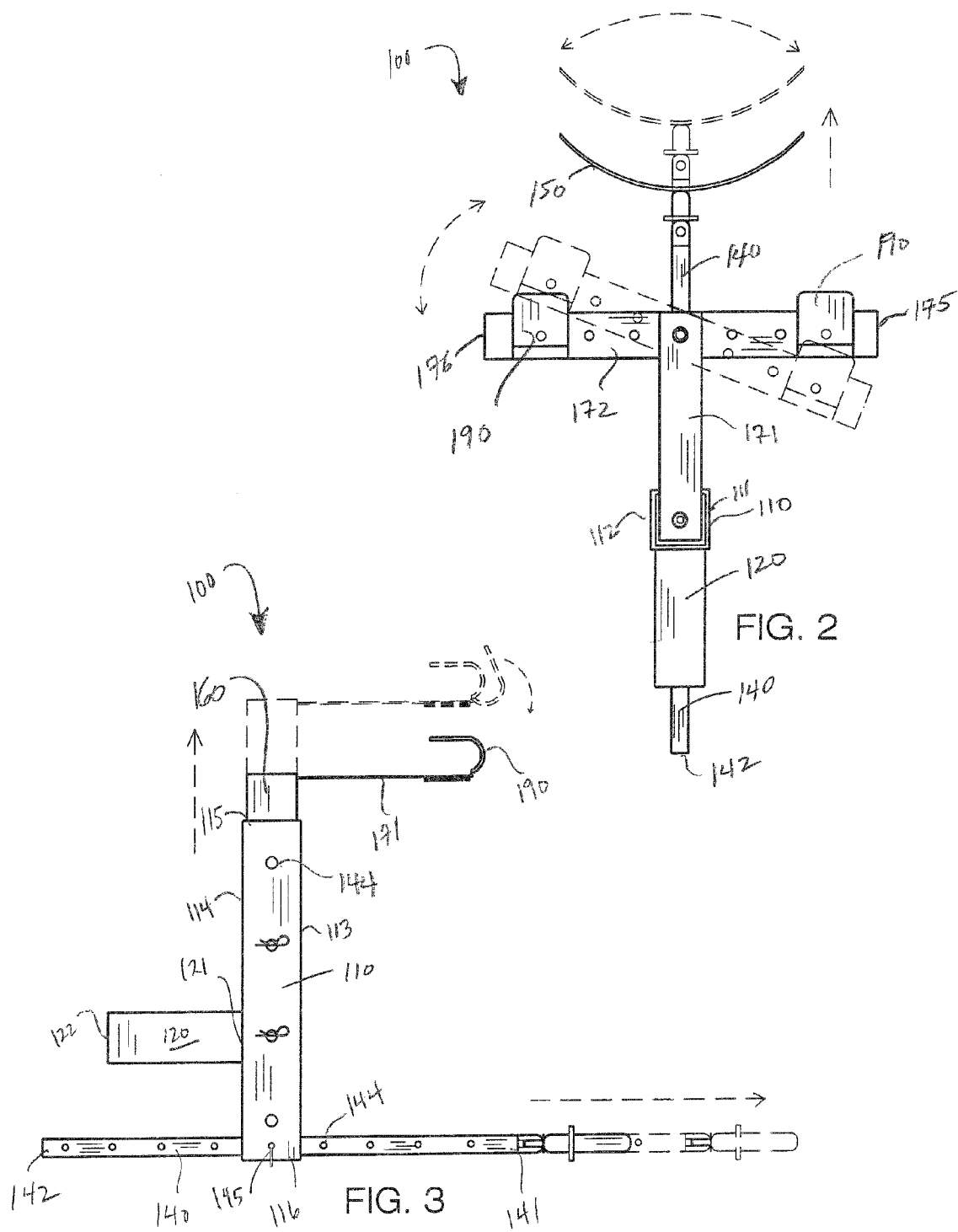

ATTACHMENT DEVICE FOR WASTE RECEPTACLES

FIELD OF THE INVENTION

The present invention is directed to a device for attaching a waste receptacle to a hitch of a vehicle.

BACKGROUND OF THE INVENTION

Waste receptacles can be particularly heavy and cumbersome, making them difficult to transport. The present invention features an attachment device for attaching a waste receptacle to the hitch of a vehicle for easy transport.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is a top view of the attachment device of the present invention.

FIG. 3 is a side view of the attachment device of the present invention.

DESCRIPTION OF PREFERRED EMBODIMENTS

Figure 1:
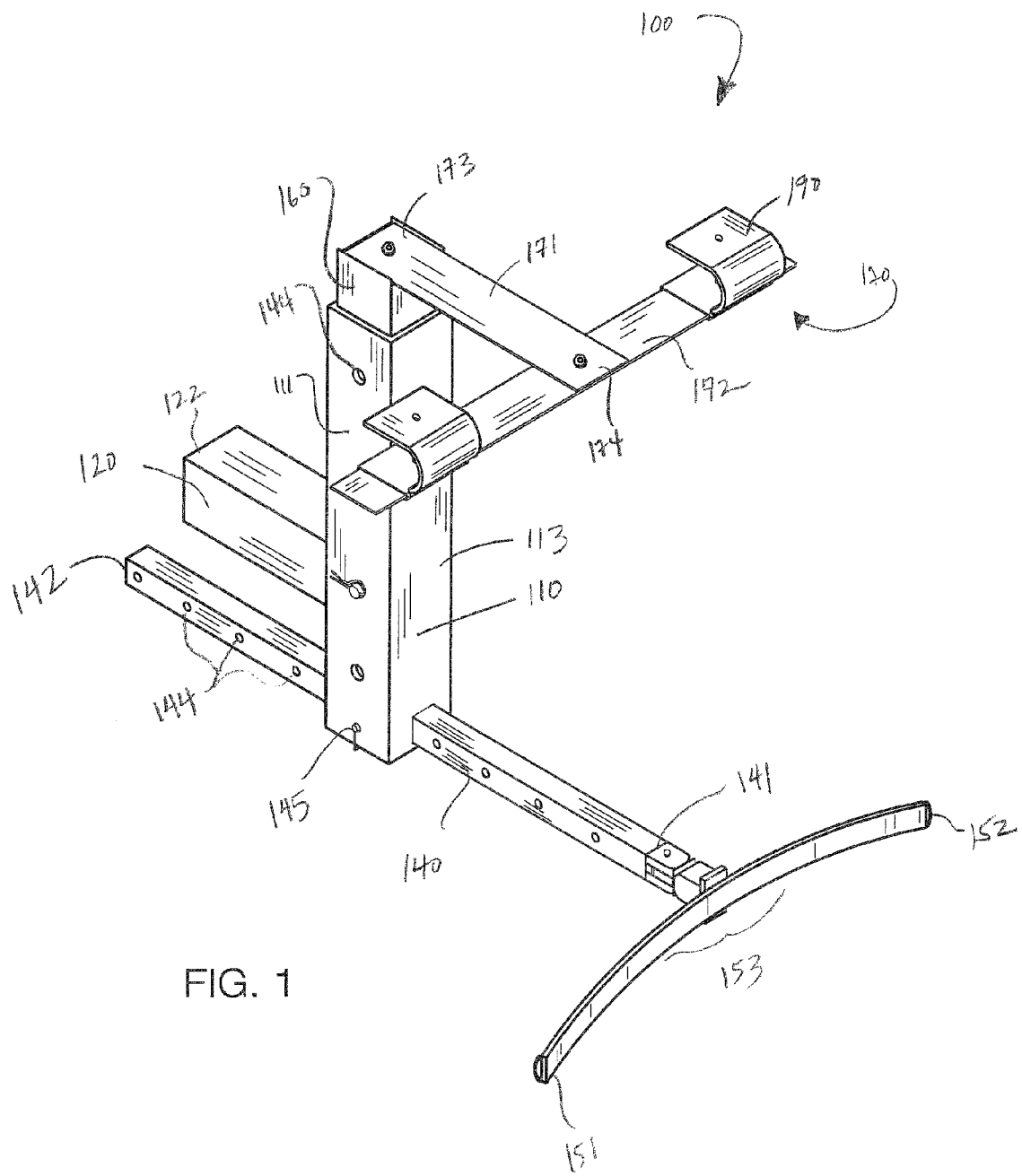
FIG. 1 is a perspective view of the attachment device of the present invention.

The following is a listing of numbers corresponding to a particular element refer to herein:
100 attachment device
105 hitch of vehicle
110 base
111 first side of base
112 second side of base
113 front surface of base
114 back surface of base
115 top end of base
116 bottom end of base
120 hitch attachment component
121 first end of hitch attachment component
122 second end of hitch attachment component
140 sliding bar
141 first end of sliding bar
142 second end of sliding bar
144 aperture
145 locking pin
150 stabilizing arm
151 first end of stabilizing arm
152 second end of stabilizing arm
153 middle portion of stabilizing arm
160 adjustable vertical component
161 top end of vertical component
170 T-shaped wing
171 first bar
172 second bar
173 first end of first bar
174 second end of first bar
175 first end of second bar
176 second end of second bar
190 gripping component
410 waste receptacle
450 outer rim of waste receptacle
480 elastic cord
490 eyelet
520 hinge bar
630 hinge
640 lock bar The present invention features an attachment device 100 for attaching a waste receptacle 410 to a hitch 105 of a vehicle. The attachment device 100 may be used to move heavy waste receptacles behind a vehicle, for example from a home to a curbside.

Figure 4:
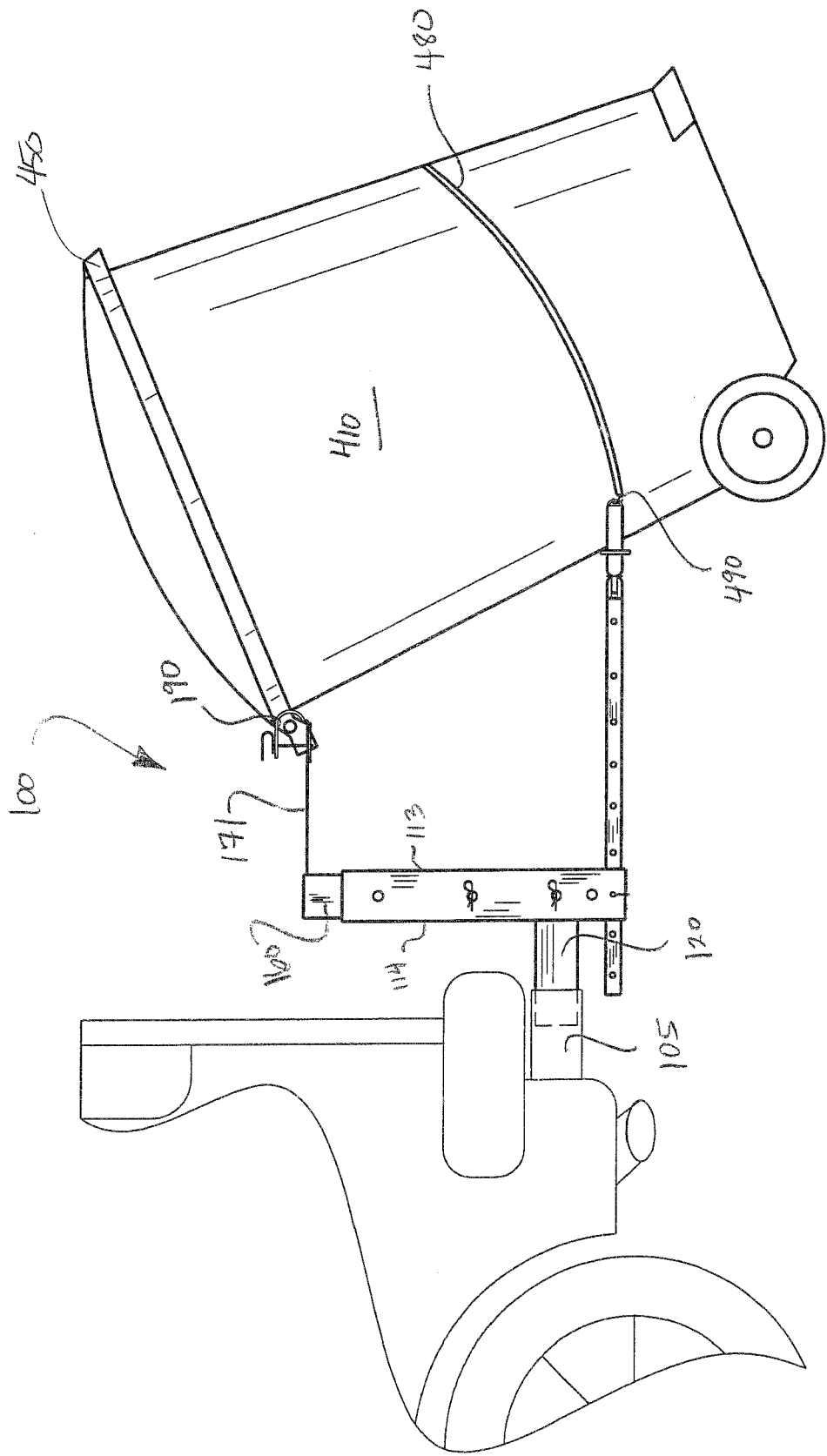
FIG. 4 is a side view of the attachment device of the present invention.
Figure 5:
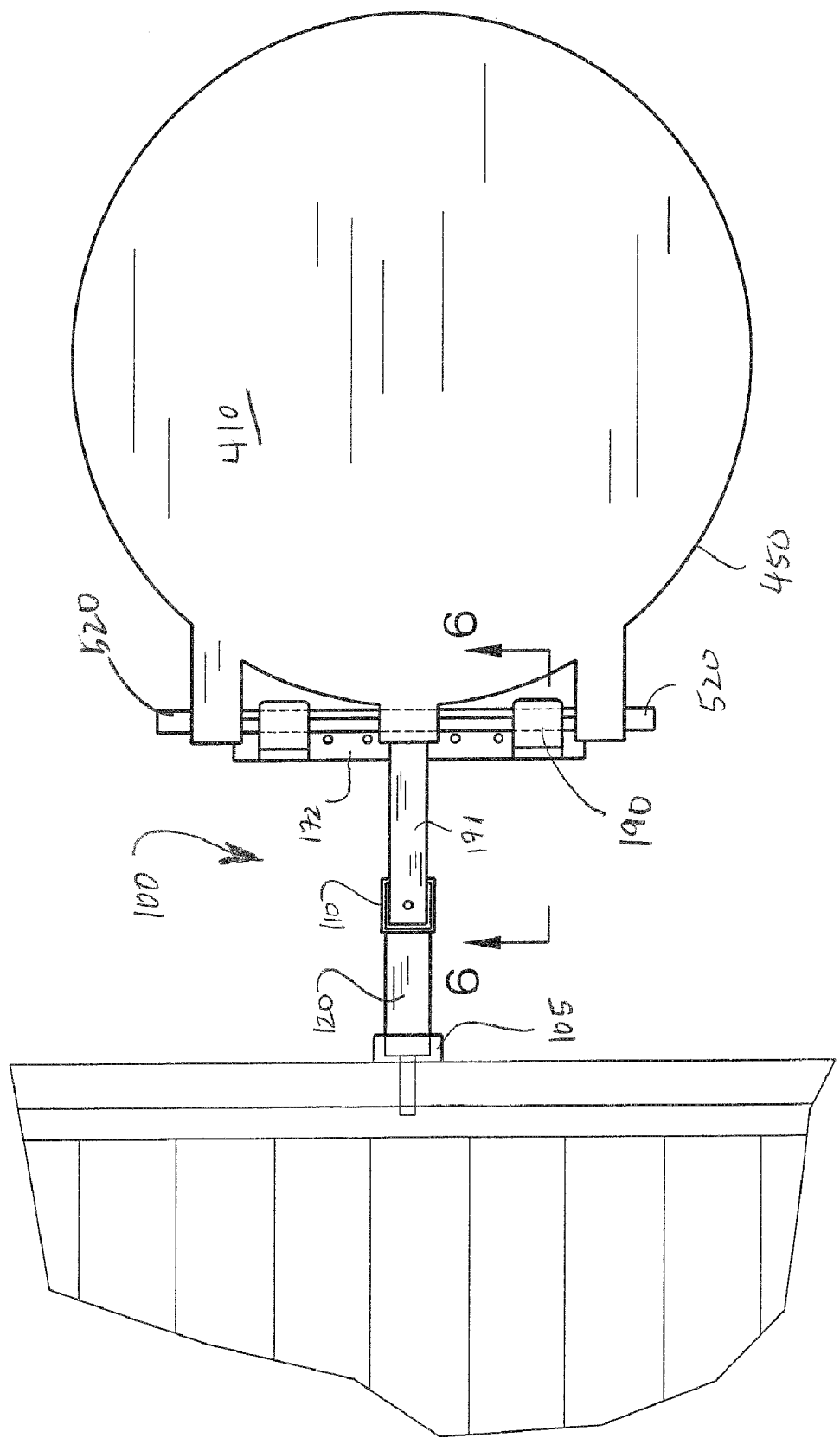
FIG. 5 is a top view of the attachment device of the present invention.
Figure 6:
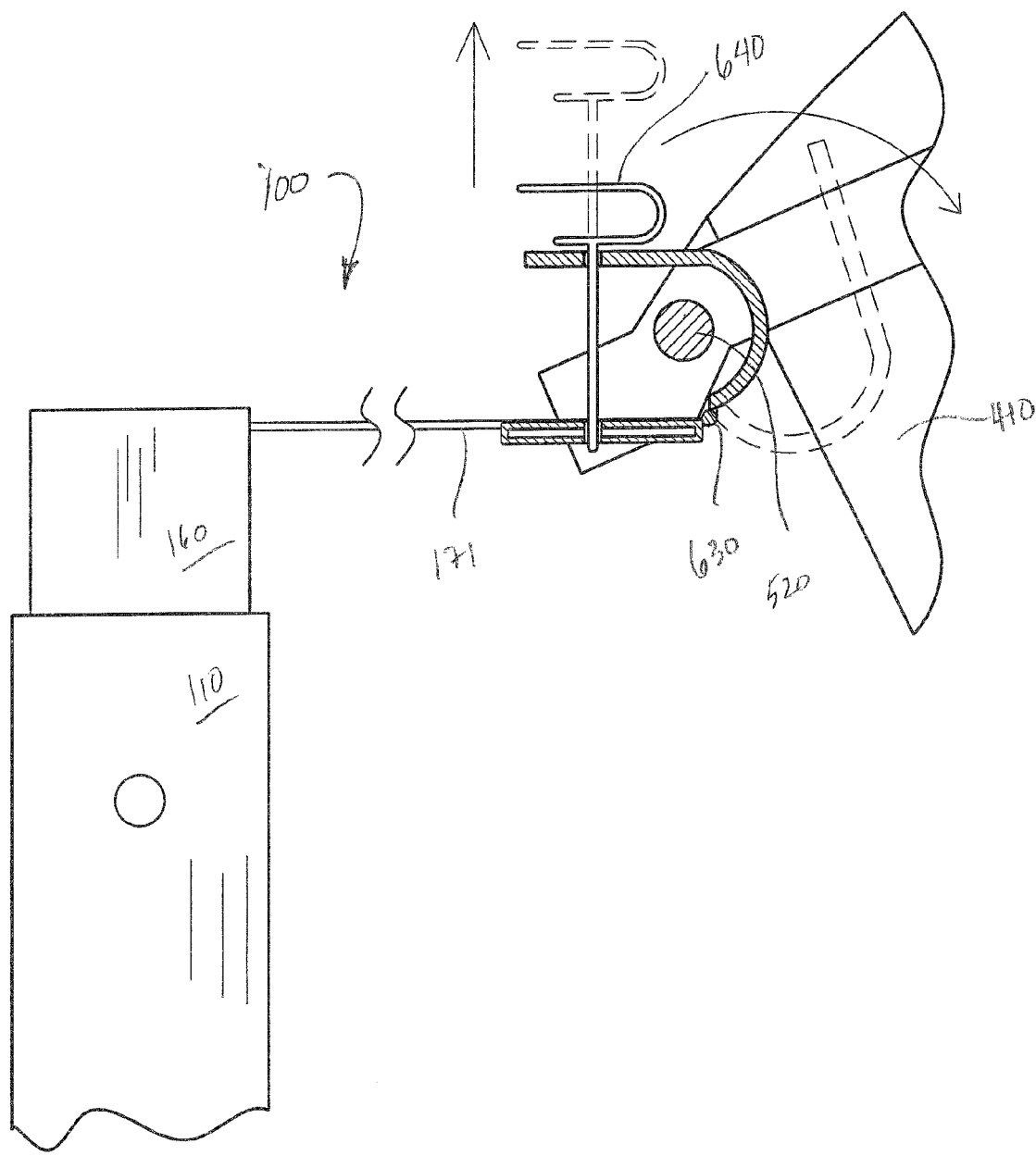
FIG. 6 is a side cross sectional view of the attachment device of the present invention.

Referring now to FIGS. 1-6, the attachment device 100 comprises an elongated and generally hollow base 110 having a first side 111, a second side 112, a front surface 113, a back surface, 114, a top end 115, and a bottom end 116. The base 110 attaches to the hitch 105 of a vehicle via a hitch attachment component 120 attached to the back surface 114 of the base 110. The hitch attachment component 120 can be attached to the hitch 105 of the vehicle via an attachment means, and such attachment means are well know to one of ordinary skill in the art. The base 110 is oriented generally perpendicularly to the ground surface (when attached to the hitch 105).

Slidably disposed in the base 110 near the bottom end 116 of the base 110 is an elongated sliding bar 140. The sliding bar 140 has a first end 141 and a second end 142. The sliding bar can slide back and forth inside the base 110, for example in the direction of the front surface 113 or back surface 114 of the base 110. The sliding bar 140 is oriented generally parallel to the ground surface.

A plurality of apertures 144 is disposed along the length of the sliding bar 140 as measured from the first end 141 to the second end 142. The apertures 144 can receive a locking pin 145. The locking pin 145 is inserted into a locking pin hole disposed in the first side 111 of the base 110 near the bottom end 116 where the sliding bar 140 is situated. A user can slide the sliding bar 140 to a position of his choice and insert the locking pin 145 through the locking pin hole and through an aperture 144 in the sliding bar 140. This locks the sliding bar 140 in place.

Disposed on the first end 141 of the sliding bar 140 is a stabilizing arm 150. The stabilizing arm 150 helps to stabilize the waste receptacle 410 when it is attached to the attachment device 100 of the present invention. The stabilizing arm 150 is arc-shaped and has a first end 150, a second end 152, and a middle portion 153. The middle portion 153 of the stabilizing arm 150 is pivotally attached to the first end 141 of the sliding bar 140. The stabilizing arm 150 can pivot with respect to the sliding bar 140.

Slidably disposed in the base 110 at the top end 115 is an elongated adjustable vertical component 160. The vertical component 160 can slide up and down within the base 110, for example in the direction of the top end 115 or the bottom end 116. A plurality of apertures 144 for receiving a locking pin 145 is disposed in the vertical component 160. A user can adjust the height of the vertical component 160 by sliding the vertical component 160 up and down in the base 110. When he/she has the vertical component 160 in a desired position, he/she can insert a locking pin into an aperture 144 in the base and through an aperture 144 in the vertical component 160. This locks the vertical component 160 in place.

The vertical component 160 has a top end 161 to which a T-shaped wing 170 is attached. The T-shaped wing 170 comprises a first bar 171 having a first end 173 and a second end 174, and a second bar 172 having a first end 175 and a second end 176, wherein the first end 173 of the first bar 171 is attached to the second bar 172 and the second end 174 of the first bar 171 is attached to the top end 161 of the vertical component 160. The T-shaped wing is oriented generally parallel to the ground surface.

Removably attached on each of the first end 175 and second end 176 of the second bar 172 is a gripping component 190. The gripping component 190 may be for gripping the outer rim 450 of the waste receptacle 410 or for gripping the hinge bar 520 on the outer rim 450 of the waste receptacle 410. The gripping component 190 can be attached anywhere along the second bar 172.

In some embodiments, the gripping component 190 is pivotally attached to the second bar 172 via a hinge 630. In some embodiments, the gripping component 190 can be pivoted downward to allow the hinge bar 520 of the waste receptacle 410. In some embodiments, the gripping component can be locked in place via a lock bar 640.

In some embodiments, an elastic cord 480 can be wrapped around the waste receptacle 410 and can be attached to the attachment device 100 of the present invention. In some embodiments, the elastic cord 480 comprises hooks for hooking into eyelets 490 disposed on the attachment device 100 of the present invention. In some embodiments, an eyelet 490 is disposed on the first end 151 of the stabilizing arm 150 and on the second end 152 of the stabilizing arm 150.

The attachment device 100 of the present invention may be constructed in a variety of sizes. In some embodiments, the base 110 is between about 18 to 24 inches in height as measured from the top end 115 to the bottom end 116. In some embodiments, the base 110 is between about 24 to 30 inches in height as measured from the top end 115 to the bottom end 116. In some embodiments, the base 110 is more than about 24 inches in height.

In some embodiments, the sliding bar 140 is between about 18 to 24 inches in length as measured from the first end 141 to the second end 142. In some embodiments, the sliding bar 140 is between about 24 to 30 inches in length as measured from the first end 141 to the second end 142. In some embodiments, the sliding bar 140 is more than about 30 inches in length.

In some embodiments, the stabilizing arm 150 is between about 18 to 24 inches in width as measured form the first end 151 to the second end 152. In some embodiments, the stabilizing arm 150 is between about 24 to 30 inches in width as measured form the first end 151 to the second end 152.

The following the disclosures of the following U.S. Patents are incorporated in their entirety by reference herein: U.S. Pat. No. 6,361,264; U.S. Pat. No. 7,101,142; U.S. Pat. No. 6,309,167; U.S. Pat. No. 6,164,896; U.S. Pat. No. 5,183,293; U.S. Pat. Application No. 2006/0291985; U.S. Pat. Application No. 2004/0232184; U.S. Pat. Application No. 2004/0164517.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An attachment device for attaching a waste receptacle to a hitch of a vehicle, said attachment device comprising:
   (a) an elongated and generally hollow base having a first side, a second side, a front surface, a back surface, a top end, and a bottom end, wherein the base attaches to the hitch of the vehicle via a hitch attachment component disposed on the back surface of the base, the base being oriented generally perpendicularly to the hitch attachment component;
   (b) an elongated sliding bar slidably disposed in the front surface and back surface of the base near the bottom end, wherein the sliding bar is oriented generally parallel to the hitch attachment component and has a first end and second end; wherein the sliding bar is locked in place by simultaneously inserting a locking pin into an aperture disposed in the base and an aperture disposed in the sliding bar;
   (c) an elongated vertical component slidably disposed in the top end of the base, the vertical component can slide up and down within the base; wherein the vertical component is locked in place by simultaneously inserting a locking pin into an aperture disposed in the base and an aperture disposed in the vertical component;
   (d) a T-shaped wing attached to and extending from a top end of the vertical component, the T-shaped wing having a first bar attached to the vertical component and a second bar perpendicularly connected to the first bar, wherein the T-shaped wing is oriented generally parallel to the hitch attachment component;
   (e) a gripping component pivotally attached to the second bar via a hinge, the gripping component is for gripping an outer rim or hinge bar of the waste receptacle; and
   (g) an arc-shaped stabilizing arm pivotally attached to the first end of the sliding bar for helping stabilize the waste receptacle when it is attached to the attachment device.

2. The waste receptacle device of claim 1 further comprising an elastic cord having hooks, wherein the elastic cord is wrapped around the waste receptacle and the hooks are hooked into eyelets disposed on the attachment device.

3. The waste receptacle device of claim 2, wherein an eyelet is disposed on the first end of the stabilizing arm and on the second end of the stabilizing arm.

4. The waste receptacle device of claim 1, wherein the gripping component can be locked in place via a lock bar.

* * * * *